Jan. 23, 1968  M. L. BENJAMIN ET AL  3,364,800
MIST COOLANT SPADE DRILL
Filed May 7, 1965
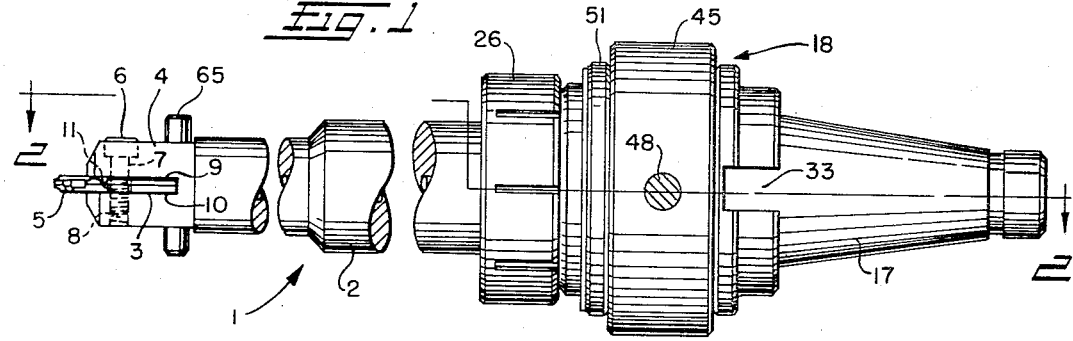
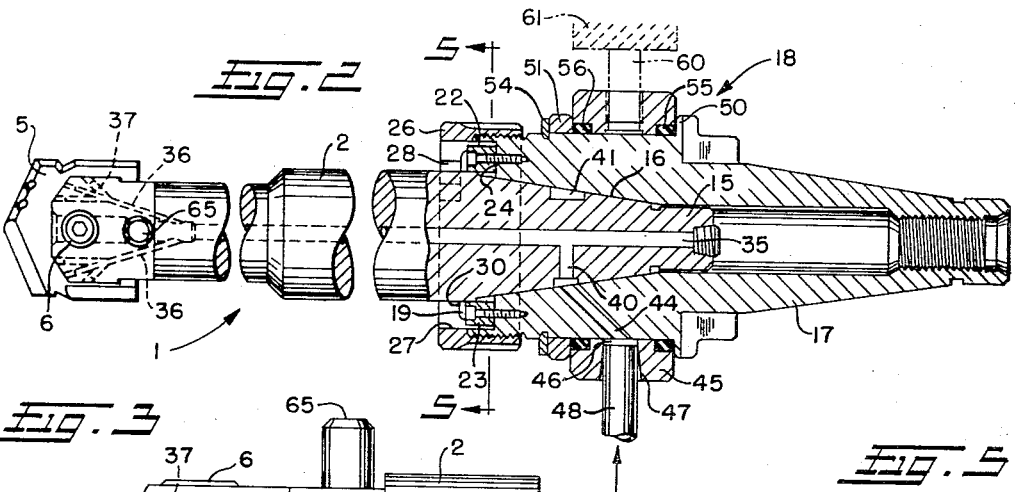
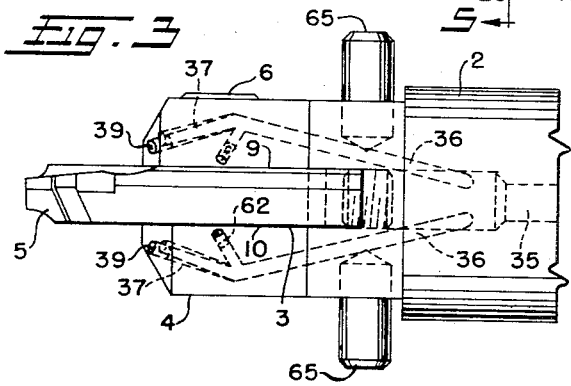
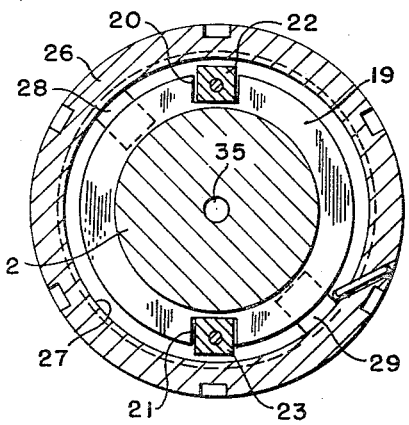
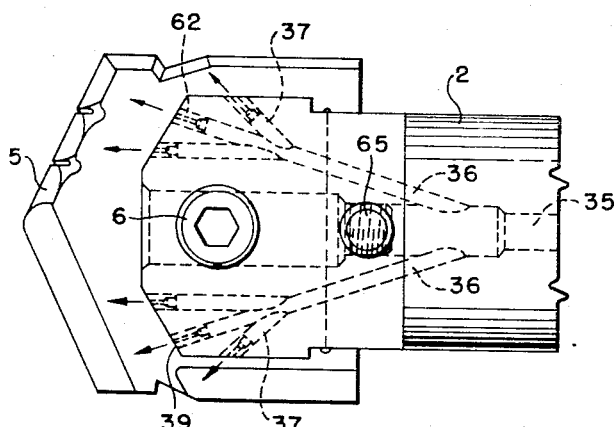
INVENTORS.
MILTON L. BENJAMIN
BY FRANKLYN E. WINNEN
Oberlin, Maky & Donnelly
ATTORNEYS United States Patent Office 3,364,800
Patented Jan. 23, 1968

3,364,800
MIST COOLANT SPADE DRILL
Milton L. Benjamin, Chagrin Falls, and Franklyn E. Winnen, Cleveland, Ohio, assignors to Erickson Tool Company, Solon, Ohio, a corporation of Ohio
Filed May 7, 1965, Ser. No. 454,150
11 Claims. (Cl. 77—68)

ABSTRACT OF THE DISCLOSURE

A cutting tool having fluid passageways therein for directing a liquid coolant onto the cutting element, and re-mister plugs disposed in such passageways for vaporizing the liquid coolant as it leaves the cutting tool. A rotary coolant bushing is provided for supplying the coolant to the cutting tool.

---

The present invention relates generally, as indicated, to a spade drill mist coolant and, more particularly, to a spade drill or other such cutting tool provided with a novel means for creating a mist coolant adjacent the cutting edges thereof.

It is well known in the tool cutting arts that an air-water vapor or mist coolant is much more effective in maintaining the cutting edges of a drill and the like uniformly cool than is a liquid or air alone, since a mist coolant is able to penetrate into cutting areas not even accessible by liquids, and with sufficient volume and velocity to remove substantially all of the heat generated. Better cooling not only increases the life of the drill, but also substantially increases the length of time between sharpenings of the cutting edges and the rate of drilling.

It has been the general practice to produce the mist coolant at a generating station remote from the cutting tool and direct the same to the cutting edges of the tool through suitable hoses and passageways formed in the tool itself. However, this technique has not proven to be entirely satisfactory, since by the time the mist coolant reaches the cutting edges, at least a portion of the mist has condensed to liquid, and, moreover, the temperature of the coolant has raised somewhat. Of course, the greater the amount of flow of mist coolant and the cooler its temperature, the more effective it is in cooling the cutting edges and workpiece.

It is therefore a principal object of this invention to provide a spade drill or other such cutting tool with a novel means for converting an air-liquid mixture into a vapor or mist, and directing such mist onto the cutting edges of the tool.

Another object is to provide a cutting tool with a novel means for re-misting condensed liquid coolant just prior to its contacting the cutting edges of the tool.

Another object is to provide such a cutting tool with a plurality of fluid passageways in which there are disposed re-mister plugs for vaporizing any liquid-air mixture passing therethrough.

A further object is to provide such a cutting tool with a novel means for introducing the mist coolant into the holder for the tool.

Still another object is to provide a tool of the type discussed above with a quick-change holder and novel means for introducing the coolant to the tool through the quick-change holder.

Yet another object is to provide such a cutting tool with buttons adjacent the cutting end thereof to eliminate chatter when the cutting tool breaks through the work.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a side elevation of a cutting tool embodying the preferred form of mist coolant producing mechanism of the present invention;

FIG. 2 is a fragmentary horizontal section of such cutting tool taken on the plane of the line 2—2 of FIG. 1;

FIG. 3 is an enlarged side elevation of the left end of the tool of FIG. 2 showing the disposition of the mist producing mechanism with respect to the cutting blade;

FIG. 4 is a top plan view of that portion of the tool shown in FIG. 3;

FIG. 5 is an enlarged vertical section taken on the plane of the line 5—5 of FIG. 2; and FIG. 6 is an enlarged longitudinal section of one of the mist producing elements of the present invention.

Turning now in detail to the drawing, and first of all to FIGS. 1 and 2, a preferred form of cutting tool constructed in accordance with the present invention is generally indicated at 1 and comprises a body member 2 having a diametrical slot 3 in one end 4 thereof for receipt of a cutting tool 5, such as a spade drill blade of the type disclosed in the Benjamin et al. Patent No. 3,076,357, granted Feb. 5, 1963. The blade 5 may be held within the slot 3 in the holder 2 as by means of a screw 6 extending through aligned openings 7 and 8 in the body member 2 intersecting the parallel sides 9 and 10 of the slot 3 when the opening 11 in the blade 5 is brought into alignment therewith, such screw 6 being adapted threadedly to engage the opening 8. Accordingly, when the screw 6 is tightened, it will draw together the parallel sides 8 and 9 of the slot 3 into firm frictional engagement with the opposite faces of the blade 5, as also discussed in such previously mentioned Benjamin et al. Patent 3,076,357.

The opposite end 15 of the body member 2 is tapered for insertion in a complementary tapered bore 16 in the spindle arbor or adaptor 17 of a quick-change chuck 18, preferably of the type disclosed in Benjamin et al. Patent No. 2,727,748, granted on Dec. 20, 1955. As best seen in FIGS. 2 and 5, the body member 2 is provided with a radially outwardly projecting flange 19 adjacent the tapered end 15, and there is a pair of diametrically opposed slots 20 and 21 in such flange into which keys 22 and 23 projecting radially outwardly from the outer face 24 of the adaptor 17 are adapted to extend for preventing relative rotation between the tool 1 and adaptor 17 when the body member 2 is properly seated in the bore 16.

Threadedly engaging the adaptor 17 is a sleeve-type clamping nut 26 having a bore 27 therethrough the diameter of which is at least as great as the outer diameter of the flange 19 and keys 22, 23. The clamping nut 26 is also provided with a pair of diametrically opposed, radially inwardly extending lugs 28 and 29 which may be aligned with the keys 22 and 23 to permit the body member 2 to be axially inserted into and withdrawn from the nut 26 when the slots 20 and 21 are brought into alignment therewith. With the body member 2 inserted into the bore 16 of the adaptor 17 and the keys 22 and 23 disposed in the slots 20 and 21 in the flange 19 of the body member 2, a slight rotation of the nut 26 in the tightening direction, usually about a quarter turn, will cause the lugs 28 and 29 to press on the outer face 30 of the flange 19 and securely clamp the body member 2 in place, thereby preventing relative axial movement between the body member 2 and adaptor 17. It is also desirable that the nut 26 be provided with a stop pin 32 for engaging one side of one of the keys 22 or 23 to halt rotation of the nut in the releasing direction when the lugs 28 and 29 are aligned with the keys 22 and 23, so as to facilitate such alignment for easy removal of the body member 2.

Of course, the quick-change chuck 18 is adapted to be mounted on the spindle of a milling machine or the like, not shown, having a tapered bore for receipt of the tapered end of the adaptor 17 and keys for insertion in the slots 33 of the adaptor 17, whereby the adaptor 17 and body member 2 are positively driven by the milling machine. For a more complete discussion of the quick-change chuck 18, reference may be had to the aforementioned Benjamin et al. Patent 2,727,748.

As previously indicated, the life of the drill blade 5 as well as the length of time between sharpenings of the cutting edges and the rate of drilling are substantially enhanced if a spray mist coolant is used to maintain the cutting edges uniformly cool. The application of such a mist coolant to the cutting edges of the drill blade 5 is preferably accomplished by introducing into the body member 2 the mist coolant through hoses leading from a remote mist producing apparatus of conventional type, and directing such mist coolant to the cutting edges of the tool through passageways in the body member 2. More specifically, as clearly shown in FIGS. 2–4, the body member 2 is provided with a central passageway 35, plugged at both ends, and having a plurality of branches 36 adjacent the slotted end 4 of the body member extending on either side of the slot 3. While the number of branches 36 may be varied as desired, four such branches are shown, two adjacent each side of the slot and extending outwardly toward the end of the body member 2 at an angle. Moreover, each branch 36 has several more branches 37 (three being shown) terminating in openings 39 adjacent opposite faces of the blade 5. The branch passageways 36 are of less diameter than the central passageway 35, and the further branch passageways 37 are still less in diameter than the passageways 36.

There is also a radially extending passage 40 in the body member 2 in fluid communication with the central passageway 35, and an annular groove 41 in the outer surface of such body member in fluid communication with a radially extending passage 44 in the adaptor 17 when the body member 2 is properly seated in the bore 16 of the adaptor, as clearly shown in FIG. 2. Accordingly, the radial passage 40 in the body member 2 need not be accurately aligned with the radial passage 44 in the adaptor 17, so long as it is in fluid communication with the annular groove 41.

Disposed about the adaptor 17 adjacent the outer end of the radial passage 44 there is a rotary coolant bushing 45 having an annular groove 46 in the inner wall thereof in fluid communication with the radial passage 44, and a bore 47 extending therethrough into the annular groove 46, whereby mist coolant from a suitable source, not shown, may be supplied to the interior of the body member 2 through a hose 48 suitably connected to the bore 47.

As evident, the bushing 45 must be mounted on the adaptor 17 for relative rotational movement with respect to the adaptor, or otherwise the hose 48 which supplies the mist coolant as aforesaid would have to rotate during rotation of the adaptor 17 with the body member 2. Accordingly, in the preferred form shown herein, the rotary coolant bushing 45 is rotatably mounted on the adaptor 17 between a flange 50 thereon and an end plate 51 held in place by a retainer ring 54. Also, a pair of O-ring seals 55 and 56 are disposed between the bushing 45 and adaptor 17 adjacent opposite sides of the annular groove 46 to preclude leakage between the bushing and adaptor. Further, it is desirable that some means, such as a rod 60 suitably connected to a support 61, be provided for holding the bushing 45 stationary as the adaptor 17 and tool holder 2 are rotatably driven.

While the quick-change chuck 18 and body member 2 of the present invention are very effective in permitting the unobstructed flow of mist coolant therethrough to the cutting edges of the drill blade 5, because the source of the mist coolant may be spaced a substantial distance from the cutting tool 1 and the passages through the tool holder 2 and quick-change chuck 18 are themselves rather long, by the time the mist coolant reaches the cutting edges of the tool blade 5, at least a portion of the mist coolant has condensed, and the temperature of the coolant has raised somewhat. Since the amount of cooling is substantially affected by the volume and temperature of the mist coolant, it is desirable to re-mist any condensed fluid and maintain its temperature as low as possible. This is accomplished by disposing re-mister plugs 62 in the openings 39 in the branches 37 adjacent the drill blade 5 for re-misting the condensed liquid prior to its being directed toward the blade cutting edges.

As clearly shown in FIG. 6, the re-mister plugs 62 have a single opening 63 therein, the diameter of which is preferably .030 to .040 inch, but it may be from .030 to .090 inch, if desired. The plugs 62 are generally between ¼ inch and 5/16 inch in O.D. and are preferably press fitted into place, although of course they may be threaded or welded in place if desired.

Not only are the re-mister plugs 62 effective in re-misting any condensed liquid that might form in the central passageway 35 in the body member 2, but the expansion of such liquid as it is vaporized causes a substantial reduction in the temperature of the vapor, thus even further enhancing the cooling action of the mist coolant.

The mist coolant entering the body member 2 through the hose 48 is generally at around 80 to 100 p.s.i. Moreover, the mist preferably consists merely of air and water vapor. However, other coolants may also be used. Further, water and air may be introduced separately or as a mixture into the body member 2 with vaporization being accomplished solely by the re-mister plugs 62. Of course, if water and air are introduced separately, separate air and water lines would be required, rather than a single hose 48, and the mixing would have to be done within the body member.

There are also provided a pair of oppositely disposed carbide buttons 65 in the end of the body member 2 adjacent the drill blade 5 extending outwardly in a direction perpendicular to the opposite faces of such drill blade. The distance between the outer ends of the buttons 65 is approximately equal to the width of the drill blade 5 so that when the point of the drill blade breaks through the workpiece, the carbide buttons 65 will give added support to the blade, and thereby substantially eliminate blade chatter.

From the above discussion, it should now be readily apparent that the tool of the present invention has a very effective and simple means for directing coolant to the cutting edges of the cutter and ensuring that such coolant is in the form of a mist and at reduced temperatures. Also, such tool substantially eliminates drill blade chatter when the point of the blade breaks through the work in a new and novel manner.

Other modes of applying the principles of the invention may be employed, change being made as regards the details described, provided the features stated in any of the following claims or the equivalent of such be employed.

We therefore particularly point out and distinctly claim as our invention:

1. In combination, a cutting tool and a quick-release chuck, said cutting tool comprising a body member, cutting means on said body member, a plurality of fluid passageways in said body member having openings adjacent said cutting means, means in said openings for converting a liquid coolant into a vapor as such liquid coolant is directed through said openings, said body member having a tapered shank on one end and an adjacent radially outwardly projecting flange, said flange having a plurality of circumferentially spaced slots therein; said quick-release chuck comprising an adapter having a tapered socket for receipt of the tapered shank of said cutting tool, a plurality of keys projecting axially outwardly from said adapter adjacent said socket and having the same circumferential spacing as the slots in said flange for insertion in said slots when brought into axial alignment therewith, a nut threaded on said adapter and having a plurality of radially inwardly extending lugs with the same spacing as said slots and keys to permit insertion of said flange through said nut when said slots, keys, and lugs are in axial alignment, the spacing between the axial inner face of said lugs and the adjacent end of said adapter being slightly greater than the thickness of said flange when said nut is in one rotary position with said lugs, slots, and keys in axial alignment as aforesaid to permit insertion and removal of said body member, said lugs being adapted to bear against said flange when said flange is disposed within said nut upon tightening of said nut thereby to lock said body member against withdrawal.

2. The combination of claim 1 wherein said quick-release chuck further comprises a rotary coolant bushing disposed about said adapter, and means mounting said bushing on said adapter for relative rotational movement therebetween, and there are passageways extending through said bushing and adapter in fluid communication with said passageways in said body member, said bushing mounting means comprising a pair of stop means on said adapter adjacent opposite ends of said bushing to preclude relative axial movement between said adapter and bushing, and seal means between said bushing and adapter on opposite sides of said passageways therein to preclude fluid leakage therebetween.

3. In combination, a cutting tool and a chuck, said cutting tool comprising a body member, a cutting element adjacent one end of said body member, a longitudinally extending passageway in said body member, a plurality of branch passages adjacent said one end in fluid communication with said longitudinal passageway, said branch passages having spaced-apart openings adjacent said cutting element, means in said openings for converting a liquid coolant into a vapor as such liquid coolant is directed through said openings, and a radially extending passage in said body member adjacent the other end in fluid communication with said longitudinally extending passageway; said chuck including an adapter, means releasably mounting said cutting tool on said adapter, a radially extending passage in said adapter, groove means between said body member and adapter for establishing fluid communication between said radially extending passages therein, a rotary coolant bushing, means mounting said rotary coolant bushing on said adapter for relative rotational movement therebetween, a radially extending passage in said bushing, and groove means between said bushing and adapter for establishing fluid communication between said radial passages therein.

4. The combination of claim 3 wherein said first-mentioned groove means is provided in the outer surface of said body member in fluid communication with said radially extending passages.

5. The combination of claim 3 wherein said second-mentioned groove means is formed in the inner surface of said rotary coolant bushing in fluid communication with said radial passage therein.

6. The combination of claim 3 further comprising a pair of oppositely disposed carbide buttons extending radially outwardly from said body member adjacent said cutting element for substantially eliminating chatter of said cuting element as it breaks through a workpiece.

7. The combination of claim 3 wherein said other end of said body member is a tapered shank and has an adjacent radially outwardly projecting flange with a plurality of circumferentially spaced slots therein; and said adapter has a tapered socket for receipt of the tapered shank of said body member, a plurality of keys projecting axially outwardly from said adapter adjacent said socket and having the same circumferential spacing as the slots in said flange for insertion into said slots when brought into axial alignment therewith, a nut threaded on said adapter and having a plurality of radially inwardly extending lugs with the same spacing as said slots and keys to permit insertion of said flange through said nut when said slots, keys, and lugs are in axial alignment as aforesaid, the spacing between the axial inner face of said lugs and the adjacent end of said adapter being slightly greater than the thickness of said flange when said nut is in one rotary position with said lugs in axial alignment with said slots and keys as aforesaid to permit insertion and removal of said body member, said lugs being adapted to bear against said flange when said flange is disposed within said nut upon tightening of said nut thereby to lock said body member against withdrawal.

8. The combination of claim 3 wherein said cutting tool is a spade drill, and said cutting means is a spade drill blade disposed in a slot in said body member, said branch passages in said body member extending on either side of said slot outwardly toward said one end of said body member at an angle.

9. The combination of claim 7 wherein said liquid vaporizing means comprises re-mister plugs disposed in said openings, said re-mister plugs having a restricted passageway therethrough which causes such liquid coolant to vaporize as aforesaid.

10. The combination of claim 9 wherein the diameter of said restricted passageways through said re-mister plugs is from .030 to .040 inch.

11. The combination of claim 10 further comprising a pair of oppositely disposed carbide button means extending radially outwardly from said body member adjacent said cutting element for reducing the chatter of said cutting element as it breaks through a workpiece.

References Cited

UNITED STATES PATENTS

| | | | |
|---|---|---|---|
| 552,065 | 12/1895 | King | 77—68 |
| 2,360,385 | 10/1944 | Anderson | 77—68 |
| 2,816,464 | 12/1957 | Willingham | 77—68 |
| 2,817,983 | 12/1957 | Mossberg | 77—68 |
| 2,946,244 | 7/1960 | Maynard | 77—55.3 |
| 2,971,409 | 2/1961 | Peters et al. | 77—68 |

OTHER REFERENCES

Machinery, Apr. 2, 1954, vol. 84; pp. 695 and 696, article entitled "Threading With Carbon Dioxide Coolant."

FRANCIS S. HUSAR, *Primary Examiner.*